US012736959B2

(12) United States Patent
Brikis et al.

(10) Patent No.: US 12,736,959 B2
(45) Date of Patent: Sep. 15, 2026

(54) METHOD FOR TRAINING A CLASSIFIER AND SYSTEM FOR CLASSIFYING BLOCKS

(71) Applicant: Siemens Aktiengesellschaft, Munich (DE)

(72) Inventors: Georgia Olympia Brikis, Plainsboro, NJ (US); Serghei Mogoreanu, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 469 days.

(21) Appl. No.: 18/561,017

(22) PCT Filed: May 24, 2022

(86) PCT No.: PCT/EP2022/064044
§ 371 (c)(1),
(2) Date: Nov. 15, 2023

(87) PCT Pub. No.: WO2022/253636
PCT Pub. Date: Dec. 8, 2022

(65) Prior Publication Data

US 2024/0255938 A1 Aug. 1, 2024

(30) Foreign Application Priority Data

May 31, 2021 (EP) .................................... 21176964

(51) Int. Cl.
*G05B 23/02* (2006.01)

(52) U.S. Cl.
CPC ..... *G05B 23/0281* (2013.01); *G05B 23/0264* (2013.01)

(58) Field of Classification Search
None
See application file for complete search history.

(56) References Cited

U.S. PATENT DOCUMENTS 8,811,594 B1 * 8/2014 Ganzhorn .......... H04M 3/5183 379/265.09
10,108,902 B1 10/2018 Lockett
(Continued)

FOREIGN PATENT DOCUMENTS

CN 112 395 159 A 2/2021
CN 112 446 239 A 3/2021
(Continued)

OTHER PUBLICATIONS

International Search Report & Written Opinion for PCT/EP2022/064044 mailed on Sep. 16, 2022.
(Continued)

*Primary Examiner* — Mehmet Yesildag
(74) *Attorney, Agent, or Firm* — Schmeiser Olsen PLLC

(57) ABSTRACT

Blocks of spatially structured information such as log files or images are processed in a training loop for an attention-based classifier, using an active learning approach. First, the classifier provides a predicted label and an attention map for each classified block. Blocks are selected from the classified blocks if the output of the classifier for the respective block meets a selection criterion. The selected blocks are then displayed to a user together with the predicted label and a visual representation of the attention map. Based on these changes, the classifier is retrained. The method allows for an automatic, intelligent selection of a small number of data points that need to be labeled by a domain expert. The domain expert does not need to collect the training data a priori, but systematically and iteratively gets asked for training examples that are then directly used by the machine learning algorithm for learning.

5 Claims, 3 Drawing Sheets

(56) References Cited

U.S. PATENT DOCUMENTS

| | | | | |
|---|---|---|---|---|
| 2017/0109709 | A1* | 4/2017 | Wu | G06F 16/9535 |
| 2020/0160070 | A1* | 5/2020 | Sholingar | G06T 7/70 |
| 2020/0226370 | A1* | 7/2020 | Adler | G06F 16/587 |
| 2021/0056071 | A1 | 2/2021 | Fradkin et al. | |
| 2021/0109973 | A1 | 4/2021 | Olympia et al. | |
| 2021/0166340 | A1* | 6/2021 | Nikola | G06V 20/56 |

FOREIGN PATENT DOCUMENTS

| | | | | | |
|---|---|---|---|---|---|
| JP | 2021 022368 | A | | 2/2021 | |
| WO | WO-2019229974 | A1 | * | 12/2019 | G06N 99/00 |

OTHER PUBLICATIONS

Zhang, Han, et al., Self-attention generative adversarial networks, International Conference on Machine Learning, 2019, arXiv:1805.08318v2 [stat.ML].

* cited by examiner

FIG 1

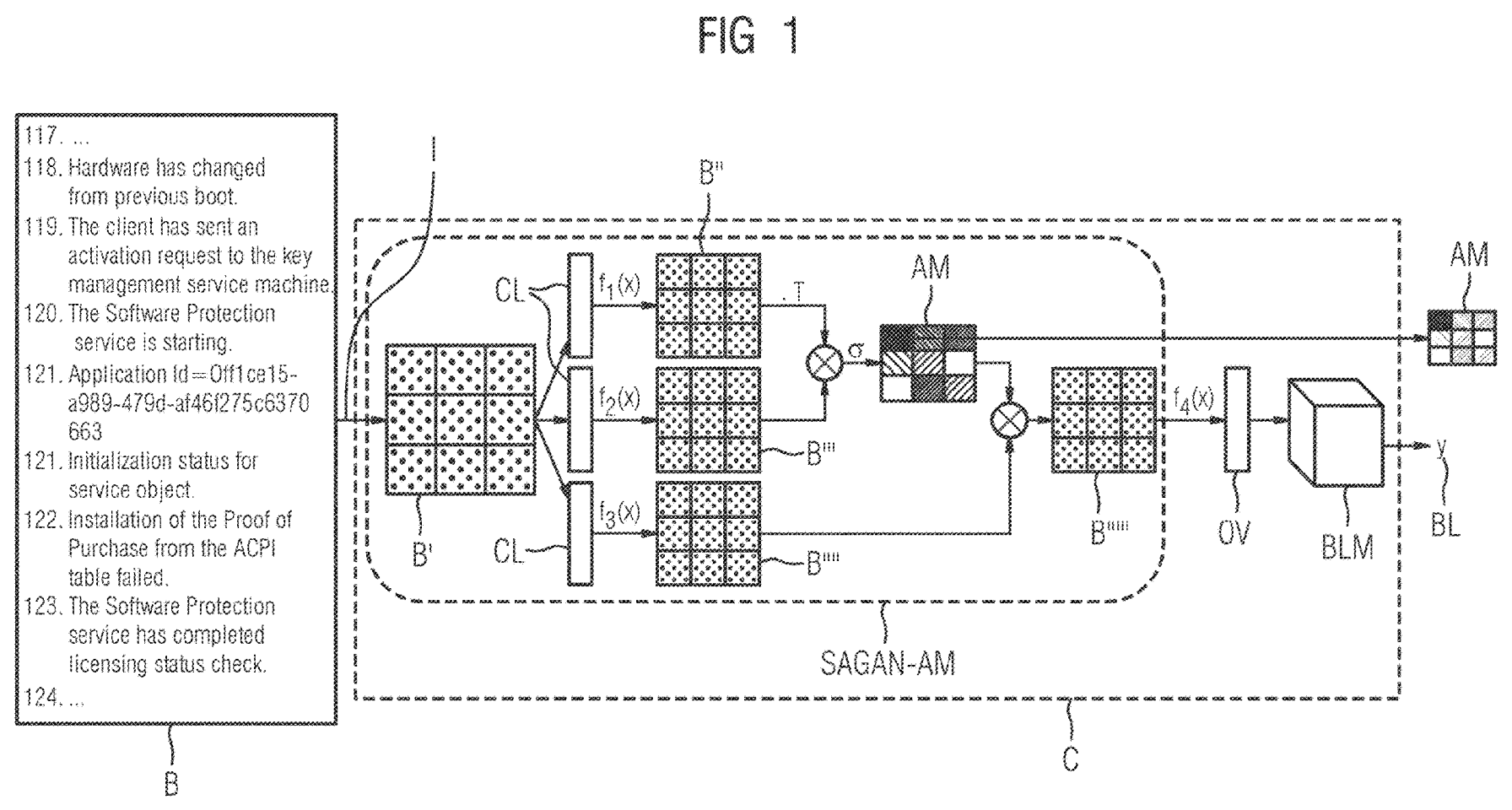

117. ...
118. Hardware has changed from previous boot.
119. The client has sent an activation request to the key management service machine
120. The Software Protection service is starting.
121. Application Id=0ff1ce15-a989-479d-af46f275c6370 663
121. Initialization status for service object.
122. Installation of the Proof of Purchase from the ACPI table failed.
123. The Software Protection service has completed licensing status check.
124. ...

B

I

B'

CL

CL $f_1(x)$ $f_2(x)$ $f_3(x)$

B''

B'''

B''''

.T

σ

AM

B'''''

$f_4(x)$

OV

BLM y

BL

AM

SAGAN-AM

C

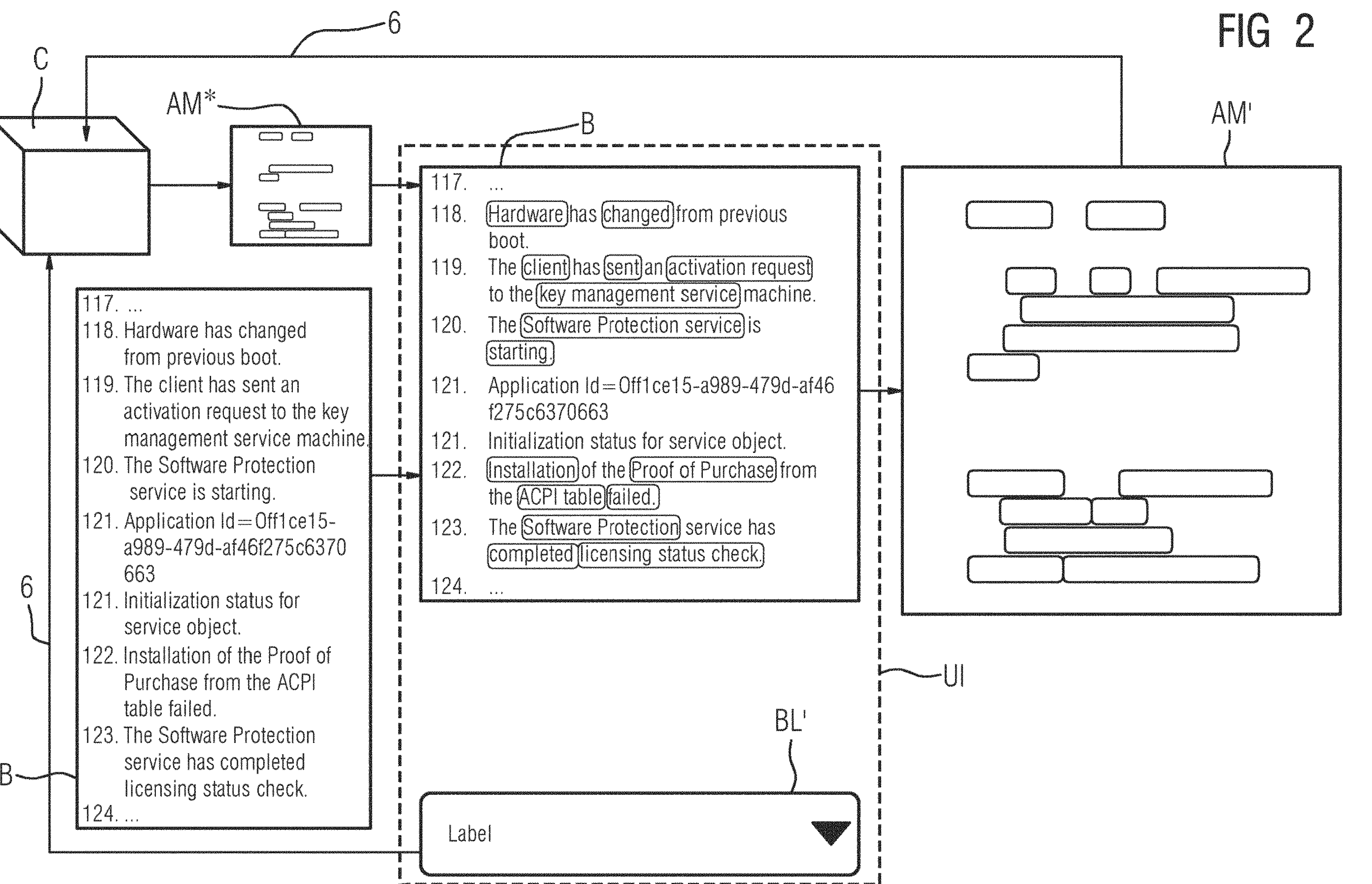
FIG 2
6
C
AM*
B
117. ...
118. Hardware has changed from previous boot.
119. The client has sent an activation request to the key management service machine.
120. The Software Protection service is starting.
121. Application Id=Off1ce15-a989-479d-af46f275c6370 663
121. Initialization status for service object.
122. Installation of the Proof of Purchase from the ACPI table failed.
123. The Software Protection service has completed licensing status check.
124. ...
6
B
117. ...
118. Hardware has changed from previous boot.
119. The client has sent an activation request to the key management service machine.
120. The Software Protection service is starting.
121. Application Id=Off1ce15-a989-479d-af46 f275c6370663
121. Initialization status for service object.
122. Installation of the Proof of Purchase from the ACPI table failed.
123. The Software Protection service has completed licensing status check.
124. ...
UI
BL'
Label
AM'

METHOD FOR TRAINING A CLASSIFIER AND SYSTEM FOR CLASSIFYING BLOCKS

CROSS-REFERENCE TO RELATED APPLICATIONS

This application claims priority to PCT Application No. PCT/EP2022/064044, having a filing date of May 24, 2022, which claims priority to EP Application No. 21176964.1, having a filing date of May 31, 2021, the entire contents all of which are hereby incorporated by reference.

FIELD OF TECHNOLOGY

The following relates to a method for training a classifier and system for classifying blocks.

BACKGROUND

Supervised machine learning solutions are being built for use cases across industry. One can find examples in predictive maintenance, traffic control, medical image diagnostics and many other fields across sectors and disciplines.

The main reason for designing and deploying custom machine learning solutions in industrial environments is the automation of certain tasks. The machine learning algorithms behind these solutions learn by uncovering patterns in training data that show them how a domain expert solved the task at hand (a priori), i.e., the training data implicitly encodes the knowledge of a domain expert.

Thus, one crucial ingredient for any supervised machine learning solution is the existence of an appropriate amount of high-quality training data. When there is not enough training data, even a perfectly designed machine learning algorithm will not be able to uncover any meaningful patterns to base its output on. And when the quality of the training data is questionable (e.g., it contains duplicates, inconsistencies, mistakes, or the statistical distribution is skewed compared to reality), the trained model could be biased in a wrong direction.

More often than not, the data required for training machine learning algorithms is not readily available. Reasons can include technical limitations or a lack of foresight when it comes to collecting training data. In the latter case, domain experts need to be involved in order to generate training data. This is costly and time consuming. For one, domain experts for specialized systems are expensive and not easily available. Secondly, the amount of data that needs to be prepared is often large, as the training examples need to cover all possible cases of the task being automated.

A concrete example for industrial applications that face the problem of training data collection are modern log file diagnostic systems. Prior to machine learning based solutions, errors in complex industrial systems were diagnosed by service engineers who manually analyzed large amounts of log files in order to find incidents (e.g., errors) in the underlying systems. In the most general sense, the analyzed log files consist of log entries that contain a timestamp and a message.

In order to automate this task, one would need pairs of incident identifiers and corresponding sequences of relevant log entries that were emitted at the time of that incident. The training data could then be used to train a model that performs the task using machine learning or other approaches.

The manual work of the service engineers, however, does not emit such training data. For one, because the work does not happen in one designated diagnosis tool, but rather involves different steps like picking up the phone and talking to the owner of the affected systems or looking up solutions on the internet. Moreover, after finding a solution the domain experts do not go back to the log files and match the solution to a sequence of log entries that were emitted at the time of the incident.

As a consequence, the purposeful collection of high-quality training data is a very expensive and time-consuming process that can block the implementation of many machine learning solutions. Thus, any development towards making this process more efficient becomes worthwhile.

SUMMARY

An aspect relates to a method for training a classifier and a system for classifying blocks that provide an alternative to the state of the conventional art.

According to the computer implemented method for training a classifier, the following operations are performed by one or more processors:

- processing, by one or more of the processors, blocks, with each block containing spatially structured information in the form of text and/or an image,
- classifying, by one or more of the processors executing a classifier that uses an attention mechanism, each block, with the output of the classifier containing a predicted label and an attention map for each classified block,
- selecting, by one or more of the processors, blocks from the classified blocks, if the output of the classifier for the respective block meets a selection criterion,
- outputting, by a user interface, each selected block, wherein each selected block is displayed together with the predicted label and a visual representation of the attention map that the classifier has outputted,
- detecting, by one or more of the processors, user interactions with the user interface, thereby receiving, by one or more of the processors, for at least one selected block a user-selected label and a user-selected attention map based on the user interactions, and
- training, by one or more of the processors, the classifier with the at least one user-selected label and the at least one user-selected attention map.

The classifier is trained to perform automated log file diagnostics based on log entries received from components of a technical system, with the technical system being in particular a complex industrial system. Each block consists of a sequence of log entries, with each log entry containing at least one timestamp and at least one message, and with the content of each block (B) being processed as text tokens. For each selected block, the visual representation of the attention map is highlighting some of the text tokens of the selected block. The classifier contains one or more convolutional neural networks with an attention mechanism. The attention mechanism is a self-attention generative adversarial networks self-attention module.

The system for classifying blocks comprises an interface, configured for receiving blocks, with each block containing spatially structured information in the form of text and/or an image, and one or more processors, configured for executing a classifier that uses an attention mechanism, with the classifier containing one or more convolutional neural networks, with the attention mechanism being a self-attention generative adversarial networks self-attention module, and with the classifier having been trained and/or being trainable with the method. Further, the one or more processors are configured for log file diagnostics by processing log entries received from components of a technical system, with the technical system being in particular a complex industrial system, with each block containing a sequence of those log entries, with each log entry containing at least one time-stamp and at least one message, and with the content of each block being processed as text tokens.

The following advantages and explanations are not necessarily the result of the object of the independent claims. Rather, they may be advantages and explanations that only apply to certain embodiments or variants.

In embodiments, the method provides attention-based active learning for expert knowledge collection and training data annotation while assisting users in their annotation efforts, thus allowing for efficient training data collection. Changes in each attention map are fed back into a training loop as visual labels.

The classifier processes the training examples using attention—an input processing technique for classifiers such as neural networks that allows the classifier to focus on specific aspects of a complex input—leading to better results and allowing for an intuitive, visual way of transferring domain expertise.

The trained classifier can be used in different applications, for example to extract data out of log files or other semi-structured data sets generated by various systems. This can potentially lead to increased system uptime and reduced maintenance costs due to earlier detection of issues. The classifier can be used on any computer systems which generates or processes spatially structured information such as log messages or images.

In embodiments, the method allows for an automatic, intelligent selection of a small number of data points that need to be labeled by a domain expert. In embodiments, the method further provides automatic suggestions for the labels, thus reducing effort for the domain expert. It provides an intuitive and visual way for the domain expert to express what he/she would pay attention to when looking at the blocks by highlighting these parts.

In embodiments, the method allows for simultaneous collection of visual and discrete labels in a training data collection process for improved accuracy. Also, there is no need for the domain expert to label every available sample.

Existing tools for training data annotation either use no active learning techniques at all or simplistic active learning techniques for choosing which data points will be presented to a user for annotation. For example, by tracking annotations made by other users, existing systems choose not to show a given user those data points that have already been annotated by others in a consistent manner. This can be done through simple statistical analysis and does not assist the user in annotation—it only reduces unnecessary efforts.

In embodiments, the method and system, or at least some of their embodiments, use attention-based active learning for improving the expert knowledge collection process.

Attention mechanisms are a powerful addition to neural networks that process complex textual and imagery input. They allow the network to focus on certain parts of the input when making its prediction. The self-attention generative adversarial networks self-attention module is a module that provides self-attention. It decides, given an input, what to attend to in the input. Although the self-attention module is known as a part of the architecture of self-attention generative adversarial networks, it can be used as part of the classifier. Other parts of the self-attention generative adversarial networks are not used for the classifier.

In embodiments, the method and system, or at least some of their embodiments, can provide log file diagnostics and automated detection of events in log entries, by automatically labeling events in the log files at the time of an incident.

In an embodiment of the method, each predicted label is a severity level of an event occurring in the technical system.

According to this embodiment, after training, the classifier can be used for automated labeling of events in log entries emitted by the components of a complex industrial system at the time of an incident. This embodiment uses active learning in the context of complex event classification/labeling.

In another embodiment of the method, each attention map is a probability distribution over the text tokens contained in the respective block, and for each selected block, each text token is highlighted in the visual representation if its probability value in the attention map exceeds a given threshold.

In another embodiment of the method, the steps of classifying, selecting, outputting, detecting, receiving and training are performed iteratively in a training loop.

According to this embodiment, a domain expert does not need to collect the training data a priori, but systematically and iteratively gets asked for training examples that are then directly used by the machine learning algorithm for learning. This so-called active learning mechanism allows to reduce human involvement and only selectively request interventions.

The process of collecting training data is therefore simplified and streamlined, reducing the burden on the involved domain experts. Furthermore, the quality of the collected training data in increased by iteratively requesting only needed training examples.

This embodiment also supports iterative labeling of stream data or additional data that become available only later in time.

The classifier improves with each iteration.

In another embodiment of the method, the selection criterion is least confidence, margin sampling, and/or entropy sampling.

In an embodiment of the system, at least some of the blocks contain sensor measurements. The system is configured for real-time processing of the log entries. It is further configured for triggering an automated action, in particular signaling an alarm or shutting down a part of the technical system, if one of the predicted labels meets a given criterion.

The computer-readable storage media have stored thereon instructions executable by one or more processors of a computer system, wherein execution of the instructions causes the computer system to perform the method.

The computer program is being executed by one or more processors of a computer system and performs the method.

BRIEF DESCRIPTION

Some of the embodiments will be described in detail, with reference to the following figures, wherein like designations denote like members, wherein:

FIG. 1 shows an architecture according to a possible exemplary embodiment of a system for classifying blocks;

FIG. 2 shows a training loop according to a possible exemplary embodiment of a method for training a classifier;

DETAILED DESCRIPTION

Figure 3:
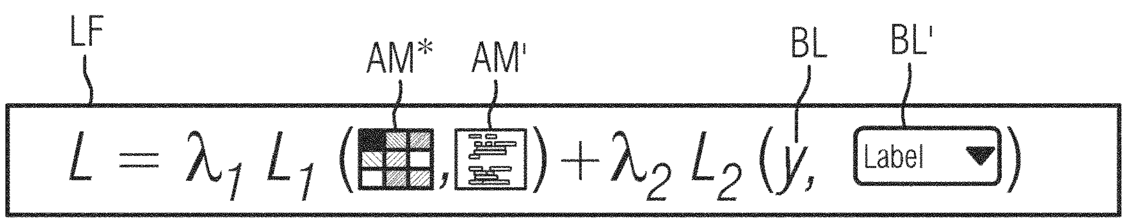
FIG. 3 shows a loss function according to a possible exemplary embodiment of the method.

Zhang, Han, et al., Self-attention generative adversarial networks, International Conference on Machine Learning, 2019, arXiv:1805.08318v2 [stat.ML], discloses a self-attention module that can be used as part of self-attention generative adversarial networks. The self-attention module decides, given an input, what to attend to in the input. The entire contents of that document are incorporated herein by reference.

US 20210056071 A1 discloses transformation of industrial computer logs into a knowledge graph. The entire contents of that document are incorporated herein by reference.

US 20210109973 A1 discloses a framework for automated knowledge extraction/graph creation from log messages. The entire contents of that document are incorporated herein by reference.

FIG. 1 shows an architecture according to a possible exemplary embodiment of a system for classifying blocks of spatially structured information. An interface I, for example a memory interface, a hard disk drive interface, or a network interface, provides access to blocks B stored in a memory, a hard disk, or a network. Each block B contains spatially structured information in the form of text and/or an image. One or more processors perform the operations described in the following.

After receiving the block B over the interface I, a classifier C using an attention mechanism classifies the block B, with the output of the classifier C containing a predicted label BL and an attention map AM for the block B.

According to the embodiment shown in FIG. 1, the classifier C contains a convolutional neural network with an attention mechanism.

The example for the convolutional neural network shown in FIG. 1 uses a self-attention module SAGAN-AM as known from self-attention generative adversarial networks and shown in FIG. 2 of Zhang, Han, et al., Self-attention generative adversarial networks, International Conference on Machine Learning, 2019, arXiv:1805.08318v2 [stat.ML]. Other parts of the self-attention generative adversarial networks are not used.

The self-attention module SAGAN-AM first translates the block B into a convolution feature map B'. The convolution feature map B' is then processed separately by three 1×1 convolution layers CL.

Let us assume that a previous convolution layer outputs an (N,F,H,W) shaped tensor where:

N is a batch size

F is a number of convolutional filters

H, W are spatial dimensions.

As this output is fed into one of the three 1×1 convolution layers CL with $F_1$ 1×1 filters, zero padding and stride 1, the output of each 1×1 convolution layer CL has the shape (N, $F_1$, H, W).

A first function $f_1(x)$, a second function $f_2(x)$, and a third function $f_3(x)$ create a first version B'', a second version B''', and a third version B'''' of the convolution feature map B'. The first version B'' and the second version B''' are used to compute the attention map AM, using a transpose function .T and a softmax function σ. The third version B'''' is used in conjunction with the attention map AM to create a self-attention feature map B'''''.

All of these processing steps, including additional preprocessing of the self-attention feature map B''''', are described in detail in Zhang, Han, et al., Self-attention generative adversarial networks, International Conference on Machine Learning, 2019, arXiv:1805.08318v2 [stat.ML]. While Zhang uses several maps at each step to accommodate different color channels of an image, a single map is sufficient at each step when processing a block of text as shown in FIG. 1.

After the processing of the self-attention module SAGAN-AM, a fourth function $f_4(x)$ converts the self-attention feature map B''''' into an output vector OV. The output vector OV is fed into a block labeling module BLM that assigns the predicted label BL to the block B. The block labeling module BLM can be implemented in many different ways, for example as a simple feedforward neural network. The block labeling module BLM computes internally a continuous confidence value for each possible label and chooses, for example, the label with the highest confidence value. The output of the classifier C not only contains the predicted label BL, but also the confidence values for all labels.

In summary, the self-attention module SAGAN-AM tells the block labeling module BLM what to attend to when classifying the block B.

The attention map AM, on the other hand, can be taken directly from the internal representation of the self-attention module SAGAN-AM. The attention map AM is the output of the attention mechanism of the self-attention module SAGAN-AM and a probability distribution over the input, here the block B.

In a variant of the embodiment, the blocks B are formed from log entries emitted by components of a complex industrial system, where each log entry consists of at least a time stamp and a text message. In this variant, each block B consists of a sequence of log entries. The contents of the block B are processed as text tokens. The embodiment shown in FIG. 1 can provide log file diagnostics, including automatic identification of events in the complex industrial system, i. e. one or more log entries that were emitted at the time of the event.

To this end, the block labeling module BLM assigns the predicted label BL to the block B as shown in FIG. 1. For example, the predicted label BL can be a severity label ("error", "warning" or "info") of the event.

For example, the block B can contain sensor measurements and be classified by the classifier C in real-time or close to real-time. If the predicted label BL meets a given criterion, an automated action can be triggered, in particular signaling an alarm or shutting down a part of the complex industrial system.

The blocks B can be manually selected or automatically generated from log files using a frequent pattern mining approach.

The classifier C has been trained with the method according to one of the following embodiments. As an alternative or in addition, the classifier C can be iteratively (re-)trained with the method according to one of the following embodiments.

FIG. 2 shows a training loop according to a possible exemplary embodiment of a method for training a classifier C, in particular the classifier C shown in FIG. 1. Again, the following operations are performed by one or more processors. Some of the operations are processing input from a user accessing a user interface UI.

A block B and the corresponding output of the classifier C are displayed on the user interface UI for further inspection.

In order to get more meaningful feedback from the user, not only the block B and its predicted label itself get displayed, but also the attention map gets translated into a visual representation—showing what the classifier C considered important for its prediction.

In the variant shown in FIG. 2, the text of the log entries composing the block B gets highlighted based on the attention map outputted by the classifier C. In particular, the attention scores for each token get pooled and normalized into a value between 0 and 1, resulting in a modified attention map AM* with normalized attention scores on token level.

Each token with a normalized attention score (according to the modified attention map AM*) higher than a given threshold gets highlighted, the others remain unhighlighted. In other words, the highlights signify which text passages influenced the prediction of the classifier C the most. Any kind of highlighting can be used, for example bold lettering or a change in background color.

The block B consists of a sequence of log entries, with each log entry containing at least one timestamp and at least one message. The content of the block B is processed as text tokens. A text token is for example a word, a file path, or a timestamp. Text tokens can be identified in the block B as being separated by a separator, for example space.

The modified attention map AM* specifies a continuous probability value for each text token in the block B. A threshold is chosen to map the continuous probability values into a Boolean decision (highlighted, not highlighted) for each text token. Any token with probability value higher than the threshold is highlighted. This threshold can then be automatically adjusted (lowered or made higher) if users of the platform often disagree with which portions of the block are highlighted.

The user then has the option to change the predicted label into a user-selected label BL' for the displayed block B and change the highlighted text portions. In particular, the user checks whether the highlighted text passages match the parts of the log entry that make it relevant to the given block B. In other words, the user needs to highlight the parts of the block B he/she would pay attention to when deciding how to label the block B. With his editing, the user creates a user-selected attention map AM'. The user-selected label BL' and the user-selected attention map AM' are then used for performing a retraining 6 of the classifier C.

Of course, the same approach can be applied to images as blocks B. In that case, the visual representation of the attention map highlights which parts in the image were considered relevant for its classification. Again, the user can not only change the predicted label of the image, but also the corresponding attention map, for example by drawing his own highlights over the image, marking, for example, areas of corrosion on an image of a machine.

Regarding the retraining 6 shown in FIG. 2, FIG. 3 shows a loss function LF according to a possible exemplary embodiment of the method. The changes made by the user get fed back to the classifier C where the classifier's suggestions get compared to the user's feedback amounting to the sum of two weighted binary-cross-entropy losses. The overall training objective of the classifier, minimizing the loss function LF, is illustrated in FIG. 3. L1 calculates the binary cross-entropy loss of the modified attention map AM* and the user-selected attention map AM'. L2 calculates the binary cross-entropy loss of the predicted label BL and the user-selected label BL'. Λ1 and λ2 are weights.

Figure 4:
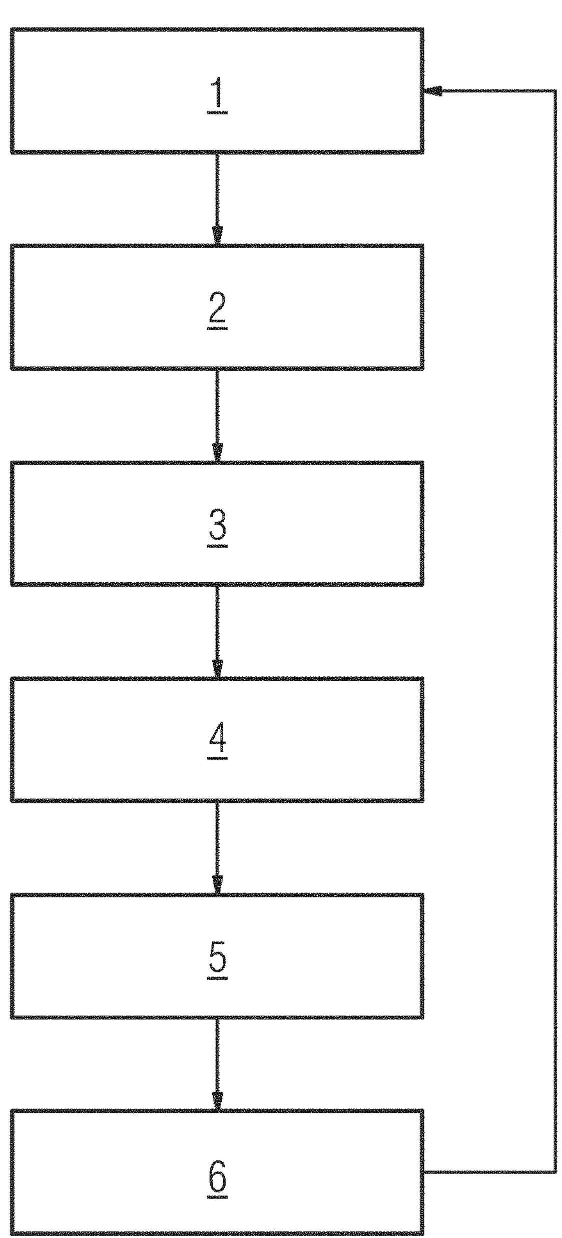
FIG. 4 shows an algorithm according to a possible exemplary embodiment of the method.

FIG. 4 shows an algorithm according to a possible exemplary embodiment of the method. Not shown in FIG. 4 are simple preparation steps, such as manually selecting and labeling blocks for an initial training of the classifier.

Again, the following operations are performed by one or more processors. Blocks are processed, with each block containing spatially structured information in the form of text and/or an image. For example, the spatial structure of log file entries can consist of line breaks and a fixed character width, resulting in a defined spatial position in two dimensions for each character in the block. Images also contain spatially structured information, for example pixels arranged in two dimensions. Furthermore, in a given block, text and image can also be overlaid.

The algorithm begins with a classification 1 of each block performed by a classifier that uses an attention mechanism, with the output of the classifier containing a predicted label and an attention map for each classified block. This step has already been described with regard to FIG. 1.

The next step is a selection 2 of blocks from the classified blocks if the output of the classifier for the respective block meets a selection criterion. The selection criterion can also be formed by a number of criteria.

The selection 2 is part of an active learning approach that decides based on the classifier predictions which block to forward to the user for labeling, thereby following a pool-based sampling strategy.

One of three selection criteria may be employed:

Forward blocks with least confidence in their most likely label (least confidence). As discussed with regard to FIG. 1, confidence values for each possible label are output by the classifier, providing the basis for this automated decision.

2. Forward blocks that have the smallest difference between the confidence values for the two most probable labels (margin sampling).

3. Forward instances with the largest entropy values (entropy sampling). The term entropy is used as defined in information theory. The entropy values can be calculated solely based on the confidence levels of the labels that the classifier is providing, or solely based on the attention maps, or based on both.

The next step is an output 3, by a user interface, of each selected block, wherein each selected block is displayed together with the predicted label and a visual representation of the attention map that the classifier has outputted. This step has already been described with regard to FIG. 2.

The next step is a detection 4 of user interactions with the user interface, including a reception 5 of a user-selected label and a user-selected attention map for at least one selected block based on the user interactions. This step has already been described with regard to FIG. 2.

The final step is a (re-)training 6 of the classifier with the at least one user-selected label and the at least one user-selected attention map. This step has already been described with regard to FIG. 2 and FIG. 3.

The algorithm then returns to step 1 or terminates the training loop. As described, the algorithm serves for efficiently collecting training data, for example in order to enable automated log file diagnostics.

In embodiments, the method can be executed by one or more processors. Each processor can be a microcontroller or a microprocessor, an Application Specific Integrated Circuit (ASIC), or a neuromorphic microchip, in particular a neuromorphic processor unit. The processor can be part of any kind of computer, including mobile computing devices such as tablet computers, smartphones or laptops, or part of a server in a control room or cloud. For example, a processor, controller, or integrated circuit of the computer system and/or another processor may be configured to implement the acts described herein.

The above-described method may be implemented via a computer program product (non-transitory computer readable storage medium having instructions, which when executed by a processor, perform actions) including one or more computer-readable storage media having stored thereon instructions executable by one or more processors of a computing system. Execution of the instructions causes the computing system to perform operations corresponding with the acts of the method described above.

The instructions for Implementing processes or methods described herein may be provided on non-transitory computer-readable storage media or memories, such as a cache, buffer, RAM, FLASH, removable media, hard drive, or other computer readable storage media. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer implemented method for training a classifier, comprising the following operations performed by one or more processors:

processing, by one or more of the processors, blocks, with each block containing spatially structured information in the form of text and/or an image, classifying, by one or more of the processors executing a classifier that uses an attention mechanism, each block, with the output of the classifier containing a predicted label and an attention map for each classified block, selecting, by one or more of the processors, blocks from the classified blocks, if the output of the classifier for the respective block meets a selection criterion, outputting, by a user interface, each selected block, wherein each selected block is displayed together with the predicted label and a visual representation of the attention map that the classifier has outputted, detecting, by one or more of the processors, user interactions with the user interface, thereby receiving, by one or more of the processors, for at least one selected block a user-selected label and a user-selected attention map based on the user interactions, and training, by one or more of the processors, the classifier with the at least one user-selected label and the at least one user-selected attention map, wherein the classifier is trained to perform automated log file diagnostics based on log entries received from components of a technical system, with the technical system being in particular a complex industrial system, each block includes a sequence of log entries, with each log entry containing at least one timestamp and at least one message, and with the content of each block being processed as text tokens, and for each selected block, the visual representation of the attention map is highlighting some of the text tokens of the selected block, the classifier contains one or more convolutional neural networks with an attention mechanism, the attention mechanism is a self-attention generative adversarial networks self-attention module, each predicted label is a severity level of an event occurring in the technical system, each attention map is a probability distribution over the text tokens contained in the respective block, and for each selected block, each text token is highlighted in the visual representation if its probability value in the attention map exceeds a given threshold.

2. The method according to claim 1, wherein the steps of classifying, selecting, outputting, detecting, receiving and training are performed iteratively in a training loop.

3. The method according to claim 1, wherein the selection criterion is least confidence, margin sampling, and/or entropy sampling.

4. Non-transitory computer-readable storage media having stored thereon instructions executable by one or more processors of a computer system, wherein execution of the instructions causes the computer system to perform a method for training a classifier, the method comprising:

processing, by one or more of the processors, blocks, with each block containing spatially structured information in the form of text and/or an image;

classifying, by one or more of the processors executing a classifier that uses an attention mechanism, each block, with the output of the classifier containing a predicted label and an attention map for each classified block;

selecting, by one or more of the processors, blocks from the classified blocks, if the output of the classifier for the respective block meets a selection criterion;

outputting, by a user interface, each selected block, wherein each selected block is displayed together with the predicted label and a visual representation of the attention map that the classifier has outputted;

detecting, by one or more of the processors, user interactions with the user interface, thereby receiving, by one or more of the processors, for at least one selected block a user-selected label and a user-selected attention map based on the user interactions; and training, by one or more of the processors, the classifier with the at least one user-selected label and the at least one user-selected attention map;

wherein the classifier is trained to perform automated log file diagnostics based on log entries received from components of a technical system, with the technical system being in particular a complex industrial system, each block includes a sequence of log entries, with each log entry containing at least one timestamp and at least one message, and with the content of each block being processed as text tokens, and for each selected block, the visual representation of the attention map is highlighting some of the text tokens of the selected block, the classifier contains one or more convolutional neural networks with an attention mechanism, the attention mechanism is a self-attention generative adversarial networks self-attention module, each predicted label is a severity level of an event occurring in the technical system, each attention map is a probability distribution over the text tokens contained in the respective block, and for each selected block, each text token is highlighted in the visual representation if its probability value in the attention map exceeds a given threshold.

5. A computer program product, comprising a non-transitory computer readable hardware storage device having computer readable program code stored therein, said program code executable by one or more processors of a computer system to implement a method which is being executed by one or more processors of a computer system and performs the method for training a classifier, the method comprising:

processing, by one or more of the processors, blocks, with each block containing spatially structured information in the form of text and/or an image;

classifying, by one or more of the processors executing a classifier that uses an attention mechanism, each block, with the output of the classifier containing a predicted label and an attention map for each classified block;

selecting, by one or more of the processors, blocks from the classified blocks, if the output of the classifier for the respective block meets a selection criterion;

outputting, by a user interface, each selected block, wherein each selected block is displayed together with the predicted label and a visual representation of the attention map that the classifier has outputted;

detecting, by one or more of the processors, user interactions with the user interface, thereby receiving, by one or more of the processors, for at least one selected block a user-selected label and a user-selected attention map based on the user interactions; and training, by one or more of the processors, the classifier with the at least one user-selected label and the at least one user-selected attention map;

wherein the classifier is trained to perform automated log file diagnostics based on log entries received from components of a technical system, with the technical system being in particular a complex industrial system each block includes a sequence of log entries, with each log entry containing at least one timestamp and at least one message, and with the content of each block being processed as text tokens, and for each selected block, the visual representation of the attention map is highlighting some of the text tokens of the selected block, the classifier contains one or more convolutional neural networks with an attention mechanism, the attention mechanism is a self-attention generative adversarial networks self-attention module, each predicted label is a severity level of an event occurring in the technical system, each attention map is a probability distribution over the text tokens contained in the respective block, and for each selected block, each text token is highlighted in the visual representation if its probability value in the attention map exceeds a given threshold.

* * * * *